United States Patent [19]

Nagata

[11] Patent Number: 4,903,318

[45] Date of Patent: Feb. 20, 1990

[54] ELECTRIC SWITCH SYSTEM FOR A POWER TOOL

[75] Inventor: Kunio Nagata, Kyoto, Japan

[73] Assignee: Omron Tateisi Electronics Co., Kyoto, Japan

[21] Appl. No.: 257,685

[22] Filed: Oct. 14, 1988

[30] Foreign Application Priority Data

Nov. 13, 1987 [JP] Japan ................................ 62-288208
Nov. 14, 1987 [JP] Japan ................................ 62-288228
Nov. 14, 1987 [JP] Japan ................................ 62-288229

[51] Int. Cl.[4] ................................................ H02P 5/04

[52] U.S. Cl. .................................... 388/840; 388/833; 388/937; 318/295; 200/1 V; 200/5 R

[58] Field of Search ......................... 318/305, 283-286, 318/291-295; 200/5 A, 175, 176, 157, 1 V, 5 R, 238, 6 R, 6 B, 293.1, 252, 530-531, 533; 388/828-831, 833, 838-840, 283-286, 287-295, 362, 367-368, 375-376; 173/2, 12; 74/813 R, 813 C, 25, 53-55

[56] References Cited

U.S. PATENT DOCUMENTS 3,926,264 12/1975 Bardwell ......................... 318/434 X
4,097,703 6/1978 Houser ............................ 200/321 X
4,179,644 12/1979 Vassos ............................ 388/937 X
4,353,422 10/1982 Bennett .............................. 74/25 X
4,412,158 10/1983 Jefferson ......................... 388/819 X
4,459,522 1/1983 Huber .................................. 318/293
4,572,997 2/1986 Yamanobe et al. ................. 388/840
4,719,395 1/1988 Aoi .................................. 388/840 X

*Primary Examiner*—William M. Shoop, Jr.
*Assistant Examiner*—David Martin
*Attorney, Agent, or Firm*—Wegner & Bretschneider

[57] ABSTRACT

An electric switch system for a DC motor powered power tool, comprising: a moveable block which is adapted to be manually displaced between a first position and a second position for speed control of the motor; a fixed block arranged adjacent to the first moveable block; a manual selection lever pivotally attached to the fixed block and adapted to be manually rotated from a neutral middle position to either side for the selection of the rotational direction of the motor; a cam structure for permitting the manual rotation of the manual selection lever in either direction away from the middle neutral position only when the moveable block is at the first position and keeping the angularly displaced state of the manual selection lever when the moveable block is displaced away from the first position. Thus, the selection of the rotational direction of the motor and the speed control of the motor can be accomplished as a continuous single operation, and the convenience of the power tool is improved. Further, since the composite control functions can be incorporated into a highly simplified integral unit, the manufacturing cost is reduced and the reliability of the system is improved.

6 Claims, 5 Drawing Sheets

ELECTRIC SWITCH SYSTEM FOR A POWER TOOL

TECHNICAL FIELD

The present invention relates to an electric switch system for DC motor powered power tools, such as electric screw drivers, electric power drills, and so forth, and in particular to such an electric switch system which can control the on-off of the power supply to the motor, the rotational direction of the motor, the rotational speed or the torque output of the motor, and the supply of electric power to the control circuit for the motor as a single unit which can be actuated as a single continuous manual operation.

BACKGROUND OF THE INVENTION

Conventionally, electric switches of this type consisted of a number of two-pole switches having independent contact units which are adapted for individual actuation for achieving the on-off control, the speed control, the reversal control of the rotational direction, and the quick stop of the motor for such a power tool. For instance, a rotary switch having a rotatable knob for switching over the polarity of the electric current supplied to the motor rotor is used for reversing the rotational direction of the motor in addition to the main control switch for controlling the on-off of the motor and, in many cases, the rotational speed of the motor.

However, the use of a large number of contact units tended to increase the number of component parts for the switch unit and made its structure highly complex, and this factor has been detrimental to the simplification of the assembly process and the reduction of the overall size and the cost of the switch structure.

BRIEF SUMMARY OF THE INVENTION

A primary object of the present invention is to provided a switch system for a DC motor powered power tool which can control the on-off of the supply of electric power to the motor, the rotational direction of the motor, and the rotational speed or the torque output of the motor as a single unit which can be actuated as a single manual operation.

A second object of the present invention is to provide such a switch system which combines the functions of the quick stop of the motor, the control of the supply of electric power to the control circuit for the motor, and/or the bypassing or jumping of the semiconductor device provided at the output end of the control circuit.

A third object of the present invention is to provide such a switch system which is convenient to use and easy to assemble.

These and other objects of the present invention can be accomplished by providing an electric switch system for a power tool which is powered by a DC motor, comprising: a moveable block which is adapted to be manually displaced between a first position and a second position; a fixed block arranged adjacent to the first moveable block; a manual selection lever pivotally attached to the fixed block and adapted to be manually rotated from a neutral middle position to either side; cam means provided between the moveable block and the manual selection lever for permitting the manual rotation of the manual selection lever in either direction away from the middle neutral position only when the moveable block is at the first position and keeping the angularly displaced state of the manual selection lever when the moveable block is displaced away from the first position; a reversion control contact set which reverses the polarity of electric current supplied to the motor of the power tool depending on the angularly displaced state of the manual selection lever in either direction; a speed control slide contact set provided between the moveable block and a fixed part for controlling the magnitude of electric current supplied to the motor.

Thus, according to the present invention, since the moveable block maintains the angularly displaced state of the manual selection lever, the selection of the rotational direction of the motor and the speed control of the motor can be accomplished as a continuous single operation, and the convenience of the power tool is improved. Further, since the composite control functions can be incorporated into a highly simplified integral unit, the manufacturing cost is reduced and the reliability of the system is improved.

According to a preferred embodiment of the present invention, the reversion contact set directly electrically connects the two ends of the motor for producing the effect of electromagnetic braking and this function is added to the composite functions of the switch system. Further, by providing a contact set as an integral part of the switch system for bypassing or jumping the output ends of the semiconductor device at the final stage of the control circuit, the power loss in the semiconductor device can be eliminated.

According to another aspect of the present invention, there are provided a pair of diodes for conducting electric current of correct polarity from either end of the motor to the control circuit. Thereby, the power switch for the control circuit may be omitted without incurring any waste of electric power. This consideration is important in the case of a battery operated power tool.

According to yet another aspect of the present invention, the cam means is provided with a pair of guide slots extending substantially in parallel with the direction of the movement of the moveable block, a connecting slot extending between first ends of the guide slots, and a guide pin which may be guided along the guide slots and the connecting slot, the guide pin being located in the connecting slot when the moveable block is at its first position and the manual selection lever is at its neutral position and the guide pin being guided along one of the guide slots when the moveable block is moved from the first position toward the second position. Thus, the structure of the cam means can be arranged in a planar arrangement which is suitable for compact design and easy assembly.

According to a particularly preferred embodiment of the present invention, the guide slots and connecting slot are provided at one end of the manual selection lever, and the guide pin is provided at a free end of an arm which is attached to the moveable block so as to be rotatable over a certain small angle. Thereby, the manual selection lever may be moved by a fairly large angle when the moveable block is at its first position, and not only a favorable feel of the manual selection lever is produced but also a sufficient stroke is produced for achieving the desired action of the applicable contact set. The length of the lateral cam slot can be selected as desired. If the length is selected to be small, for instance, smaller than is required to actuate the contact set for selecting the rotational direction of the motor, the longitudinal cam slots may diverge away from the lateral cam slot so that the movement of the moveable block may be converted into the lateral motion of the manual selection lever by the cooperation between the guide pin and the longitudinal cam slot.

BRIEF DESCRIPTION OF THE DRAWINGS

Now the present invention is described in the following with reference to the appended drawings, in which.

BRIEF DESCRIPTION OF THE PREFERRED EMBODIMENT

Figure 1:
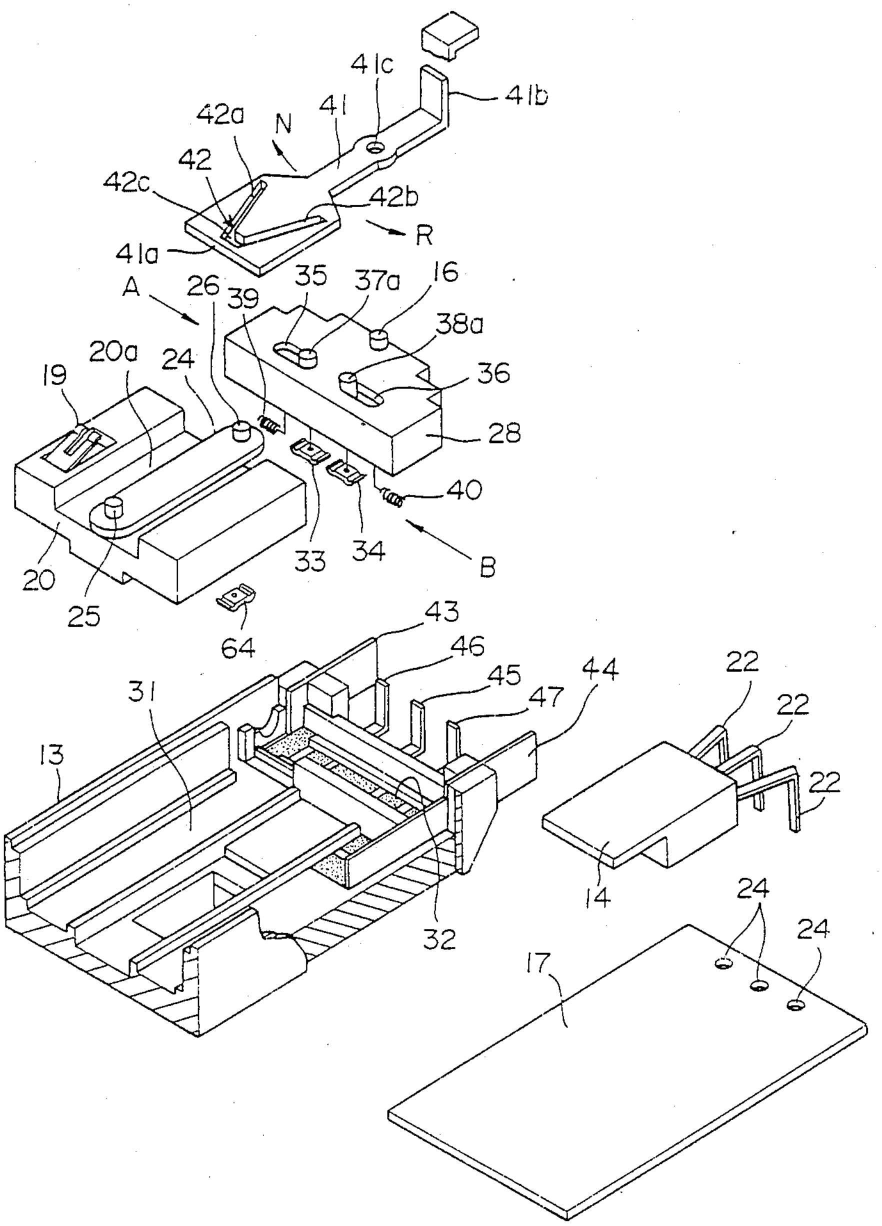
FIG. 1 is an exploded perspective view of an essential part of a DC motor powered power tool to which an embodiment of the switch system according to the present invention is applied.
Figure 2:
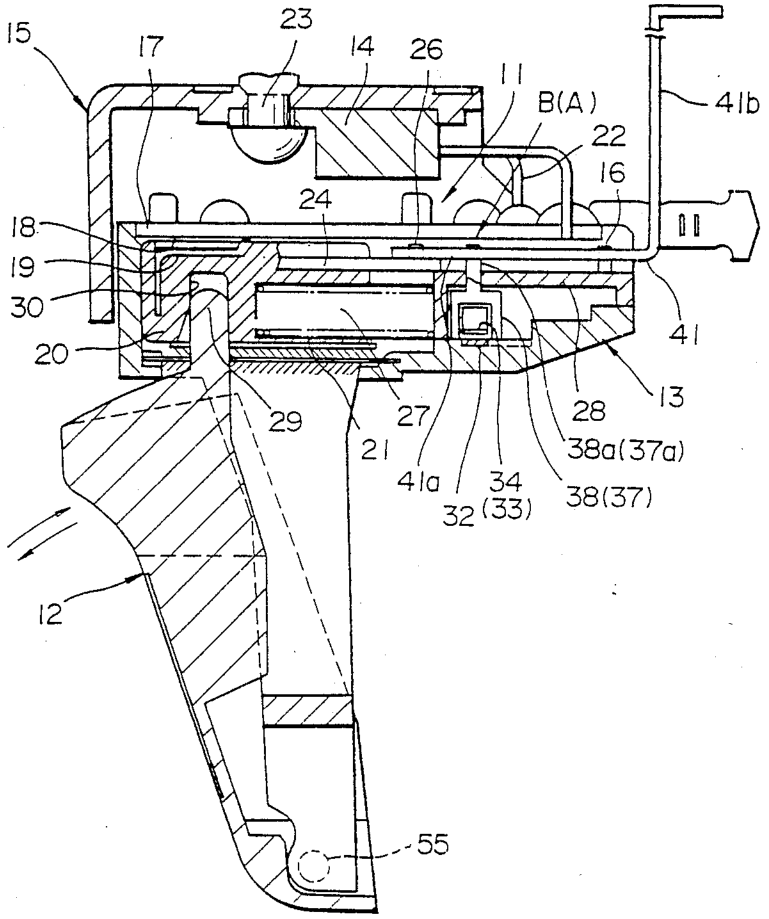
FIG. 2 is a longitudinal sectional side view of this DC motor powered power tool.
Figure 3:
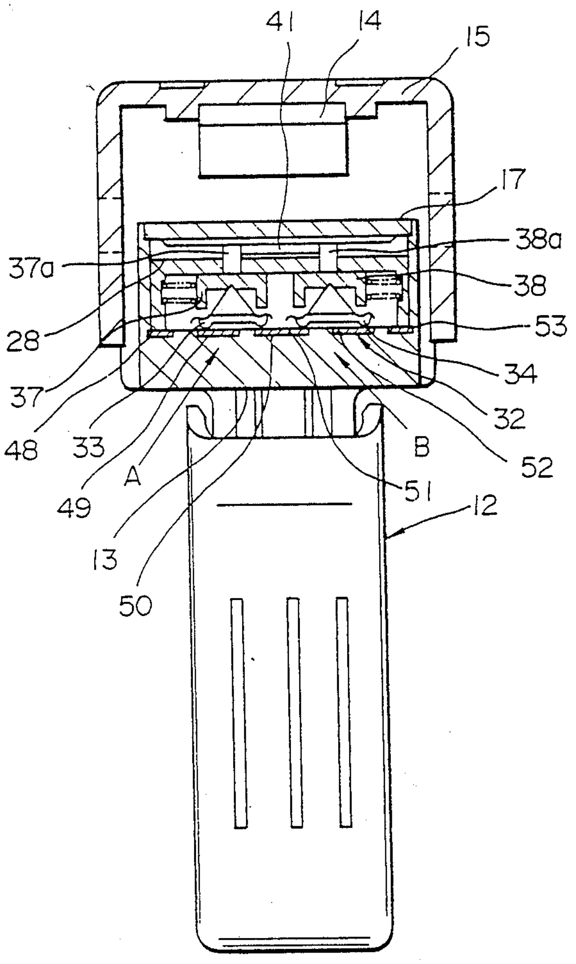
FIG. 3 is a longitudinal sectional front view of this DC motor powered power tool.

FIGS. 1 through 3 generally illustrate an electric switch structure for a DC motor powered power tool which, for instance, may consist of an electric screw driver, and this electric switch structure, which may be incorporated, for instance, in the grip of a power tool, comprises a control circuit unit 11 for a DC motor (not shown in the drawings), an operation lever 12 for manually controlling the motor, and a switch casing 13 which support them.

The control circuit unit 11 comprises a power transistor 14, a heat radiation cover 15 which covers this power transistor 14 from above, a printed circuit board 17 which carries a control circuit and fixedly secured to the switch casing 13, a moveable block 20 which is made of synthetic resin material and is slidably guided along the fore-and-aft direction within the switch casing 13, a return spring 21 for this moveable block 20, a resistor board 18 of a small thickness which is provided as a part of a variable reference voltage generator and securely attached to the lower surface of the printed circuit board 17, a brush 19 which consists of an electroconductive elastic piece received in the moveable block 20 so as to slide over the surface of the resistor board 18 as the moveable block 20 is moved along the fore-and-aft direction as described hereinafter.

The power transistor 14 is generally rectangular in shape, and is provided with three leads 22 which project from one side face thereof and are bent downward to be connected to appropriate parts of the control circuit as described hereinafter. The heat radiation cover 15 is shaped as a box having an open bottom, and is mounted integrally over the switch casing 13 surrounding the printed circuit board 17 with the power transistor 14 attached to the interior of the heat radiation cover 15 with a small screw 23.

Terminal connection holes 24 are formed in a peripheral part of the printed circuit board 17 for receiving lead wires therethrough as required. To the lower surface of the printed circuit board 17 is bonded the resistor board 18 which has printed thereon the resistive element for the variable reference voltage generator for the motor.

The moveable block 20 is constructed as a hollow box, and the central part of its upper surface is provided with a longitudinal depression 20*a* extending along the direction of the sliding motion of the moveable block 20. In this depression 20*a*, the horizontally rotatable arm 24 is pivoted at its front end as denoted by numeral 25. From the rear end of the moveable arm 24 projects upwardly a guide pin 26.

The part of the upper surface of the moveable block 20 which is located on one side of the depression 20*a* is provided with the brush 19 which slides over the surface of the resistor board 18 attached to the lower surface of the printed circuit board 17 in such a manner that the resistive value for the torque control of the motor is varied for the control of the torque of the motor by sliding the moveable block 20 along with the brush 19 with respect to the resistor board 18 and varying its point of contact relative to the resistor board 18.

The brush 19, along with the moveable block 20, is normally biased in the direction to maximize the produced resistive value or to its front most position by a compression coil spring 21. Specifically, the the lower surface of the rear end of the moveable block 20 defines a bore 27 for receiving one end of the return spring 21 whose other end is received and engaged by the front surface of a contact unit cover 28 provided at the rear end of the switch casing 13 as described hereinafter in such a manner that the moveable block 20 may be urged forwardly under the spring force of this return spring 21.

The lower surface of the front end of the moveable block 20 is provided with a hole 30 for receiving an actuation shaft 29 of the operation lever 12 which is described hereinafter in such a manner that the depression of the operation lever 12 to the right in FIG. 2 causes the sliding motion of the moveable block 20 along the fore-and-aft direction by way of the actuation shaft 29.

The switch casing 13 is formed as a box with an open top; the moveable block 20 is received in this upper opening 31 in slidable manner along the fore-and-aft direction, and the printed circuit board 17, the power transistor 14 and the heat radiation cover 15 are placed above the moveable block 20 in an integrally mutually joined state.

The rear part of the upper opening 31 is provided with a switch base board unit 32 for reversing the rotational direction of the motor. This switch base board unit 32 cooperates with a pair of moveable contact pieces 33 and 34 which are supported by the respective sliders 37 and 38 on either side in laterally slidable manner, and the switch base board unit 32 and the moveable contact pieces 33 and 34 are covered by the contact unit cover 28.

The upper surface of the contact unit cover 28 is provided with laterally elongated guide slots 35 and 36 for guiding the sliding motions of the moveable contact pieces 33 and 34 by way of slider pins 37*a* and 38*a* integrally projecting from the corresponding sliders 37 and 38 and passed upwardly through these guide slots 35 and 36. The moveable contact pieces 33 and 34 are urged toward the central part or, in other words, toward each other by return springs 39 and 40 with the result that the slider pins 37*a* and 38*a* normally abut the respective edges of the corresponding guide slots 35 and 36 as illustrated in FIG. 1.

Thus, the slider 37, the moveable contact piece 33 and the switch base board unit 32 form one of the slide switch units A while the slider 38, the moveable contact piece 34 and the switch base board unit 32 form the other slide switch unit B.

From a part of the upper surface of the contact unit cover 28 located to the rear of the guide slots 35 and 36 integrally projects a pivot pin 16 which is fitted into a pin hole 41*c* of a reversion control switching lever 41. This reversion control switching lever 41 is increased in width or shaped like a racket on one side of the pin hole 41*c*, and this racket-shaped part 41*a* extends between the slider pins 37*a* and 38*a* toward the moveable block 20. This racket-shaped part 41*a* is provided with a cam slot 42 which is V-shaped as seen from above for receiving the guide pin 26 of the horizontally rotatable arm 24 therein from below. This cam slot 42 is provided with a pair of longitudinal cam slot sections 42*a* and 42*b* which converge from the pin hole 41*c* toward the guide pin 26 along the fore-and-aft direction and a lateral cam slot section 42*c* which laterally connects the front most ends of the longitudinal cam slot sections 42*a* and 42*b*.

The rear portion of the reversion control switching lever 41 is provided with a finger knob 41*b* which projects upwardly in the shape of letter L, and, as shown in FIG. 2, in the assembled state of the electric switch system for a DC motor powered power tool, the racket-shaped portion 41*a* is located between the printed circuit board 17 and the contact unit cover 28 whereas the finger knob 41*a* protrudes outwardly from the switch system for manual operation.

As can be understood from the following description, the reversion control switch lever 41 selects the rotational direction of the motor. When the moveable block 20 is at its front most position and the guide pin 26 is received in the lateral cam slot section 42*c*, the reversion control switching lever 41 may be rotated laterally by a certain angle in either direction as permitted by the length of the lateral cam slot section 42*c* and the slight pivoting motion of the horizontally rotatable lever 24 within the depression 20*a*. As a result, either one of the slider pins 37*a* and 38*a* is pushed outwardly by the corresponding lateral edge of the reversion control switching lever 41 outwardly. The stroke of this pushing motion may be either sufficient or insufficient to actuate either one of the slider switch units A or B. Even in the latter case, since the longitudinal cam slot sections 42*a* and 42*b* diverge toward the rear part, the reversion control switching lever 41 will be angularly displace enough to actuate either one of the slider switch units A or B as the moveable block 20 is displaced rearwardly.

When the moveable block 20 is pressed rearwardly by depression the operation lever 12, the guide pin 26 moves into one of the longitudinal cam slot sections 42*a* or 42*b*, depending on the rotational direction of the reversion control switching lever 41, and the reversion control switching lever 41 is held at its angularly displaced position owing to the cooperation between the guide pin 26 and the corresponding longitudinal cam slot section 42*a* or 42*b*.

The rear surface of the switch casing 13 is provided with five terminals. Specifically, a first power source terminal 43 and a second power source terminal 44 are placed on either outer most side end, and between them are placed a first motor terminal 46, a common terminal 45 and a second motor terminal 47, from right to left as seen from the rear.

The switch base board unit 32 carries contacts 48 through 53 embedded therein by insert molding for cooperation with the contact pieces 33. Specifically, a common contact 49, an NO (normally open) contact 48 and an NC (normally closed) contact 50 are provided for one of the slide switch units A, and a common contact 52, an NC contact 51 and an NO contact 53 are provided for the other slide switch units B. As can be seen from FIG. 3, the NC contacts 50 and 51 consist of a single, common electroconductive strip.

Figure 4:
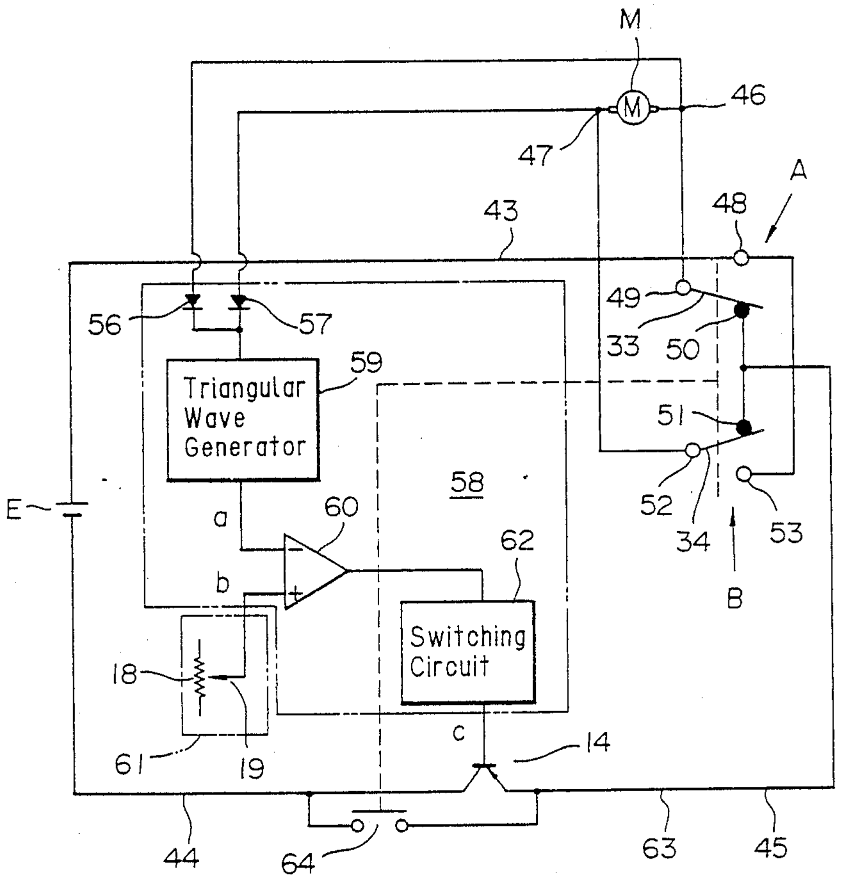
FIG. 4 is a circuit diagram of the control circuit for this power tool.

As shown in FIG. 4, the common contact 49 is connected to the first motor terminal 46 while the common contact 52 is connected to the second motor terminal 47. The NC contacts 50 and 51 are commonly connected to the common terminal 45 which is in turn connected to the emitter of the power transistor 14 by way of a line 63. The NO contacts 48 and 53 are commonly connected to the first power source terminal 43. The first power source terminal 43 is also connected to the positive end of the power source E whose negative end is connected to the collector of the power transistor 14 by way of the second power source terminal 44.

In the control circuit shown in FIG. 4, the two ends of the motor M or the first and second motor terminals 46 and 47 are connected to a triangular wave generator 59 in a rotational speed control circuit 58 by way of normally connected diodes 56 and 57. Thus, whenever a voltage is applied to the motor M, irrespective of its polarity, a voltage of fixed and correct polarity is applied to the triangular wave generator 59 and other parts of the control circuit 58.

The triangular wave generator 59 which consists of resistors, capacitors and amplifiers supplies a pulse width control signal a to one of the inputs of a comparator 60 whose other input is connected to the variable reference voltage generator 61 provided with the resistor base board 18 and the brush 19. The variable reference voltage generator 61 is a circuit for producing a voltage which is proportional to the operation stroke of the operation lever 12 as can be readily understood from the preceding description.

Figure 5:
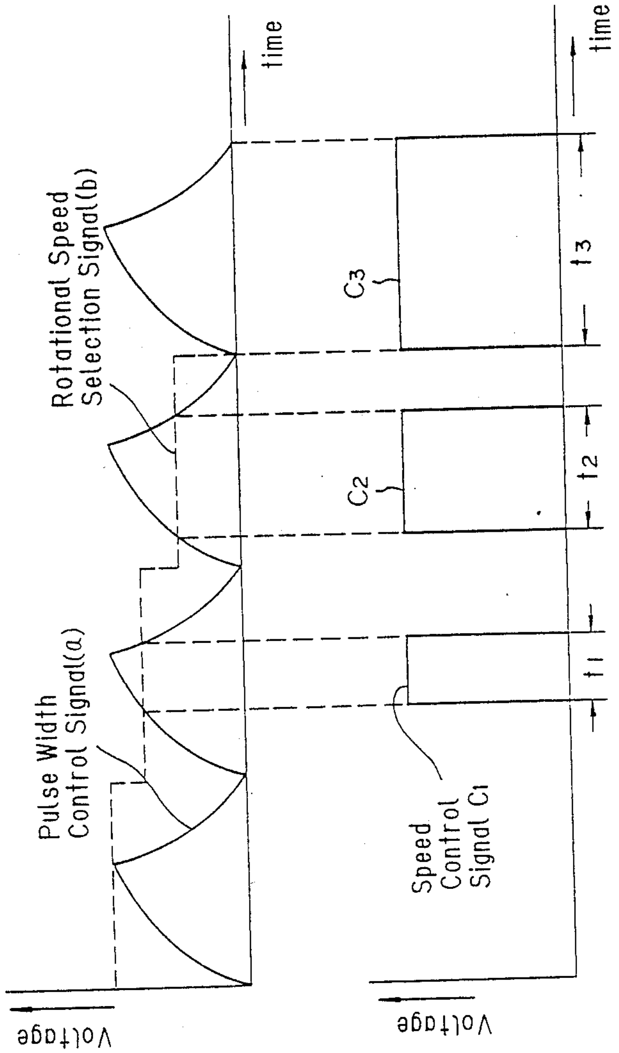
FIG. 5 is a diagram showing the wave forms at various parts of the control circuit.

Specifically, as shown by the horizontal broken lines in the upper part of FIG. 5, the variable reference voltage generator 61 produces a high voltage when the operation stroke of the operation lever 12 is zero (interval $t_1$), a medium voltage when the operation stroke of the operation lever 12 is medium (the interval $t_2$) and produces a low (zero) voltage when the operation stroke of the operation lever 12 is large (the interval $t_3$), as a rotational speed selection signal b indicated in the same drawing.

The comparator 60 compares the pulse width control signal a from the triangular wave generator 59 with the rotational speed selection signal b, and produces a speed control signal denoted with symbols C1, C2, and C3 in FIG. 5. The output of the comparator 60 is connected to the base of the power transistor 14 by way of a switching circuit 62. The switching circuit 62, which may, for instance, consist of transistors and resistors, controls the electric current of the motor main circuit 63 by way of the power transistor 14 according to the output of the comparator 60 or the speed control signal C1, C2, C3, and, as can be understood from FIG. 5, supplies electric current to the main circuit 63 for the time interval $t_1$ by supplying a suitable voltage to the base of the power transistor 14 for the time interval $t_1$ when the operation stroke of the operation lever 12 is small and the speed control signal C1 is produced, for the time interval $t_2$ by supplying the suitable voltage to the base of the power transistor 14 for the time interval $t_2$ when the operation stroke of the operation lever 12 is medium and the speed control signal C2 is produced, and for the time interval $t_3$ by supplying a suitable voltage to the base of the power transistor 14 for the time interval $t_3$ when the operation stroke of the operation lever 12 is large and the speed control signal C3 is produced.

The switch 64 connected in parallel with the power transistor 14 in FIG. 4 is closed for producing the maximum torque of the motor M when the moveable block 20 is moved all the way to the rear and a contact piece 64 provided in the lower surface of the moveable block 20 cooperates the corresponding contact set provided in an extension of the base board unit 32.

The electric switch system for the DC motor powered power tool having the above described structure is incorporated in the grip of the power tool, and the operation lever 12 normally protrudes outwardly from the front surface of the grip with a slanted orientation urged outwardly under the spring force of an internal spring (not shown in the drawings) so as to be depressed inwardly about a pivot hole 55 provided at its lower lend.

When the operation lever 12 is depressed with the reversion control switching lever 41 turned in the direction indicated by an arrow N in FIG. 1 about the pivot pin 16 by using the finger know 41*b* prior to the use of the power tool, the moveable block 20 which cooperates with this lever 12 slides rearwardly (to the right in FIG. 2). Due to the above mentioned displacement of the reversion control switching lever 41, this sliding movement of the moveable block 20 causes the guide pin 26 to move along one of the cam slot sections 42*a* of the cam slot 42 and the reversion control lever 41 to be forced even further in the same direction. Therefore, one of the slider pins 37*a* engaged to this lever 41 is pressed in the same direction, and the slider 37 connected to this slider pin 37*a*, along with the moveable contact piece 33, undergoes a sliding motion, thereby connecting the contacts 48 and 49 shown in FIG. 4 to each other.

As a result, electric current is conducted through the path defined by the first power source terminal 43, the NO contact 48, the moveable contact piece 33, the common contact 49, the first motor terminal 46, and DC motor M, the second motor terminal 47, the common contact 52, the moveable contact piece 34, the NC contact 51, the common terminal 45, the power transistor 14, and the second power source terminal 44, and the power source is turned on so as to drive the motor M in the normal direction.

At this moment, the voltage applied to the two ends of the motor M is supplied to the triangular wave generator 59 by way of the diodes 56 and 57 as a power source therefor. Therefore, the control circuit receives electric power only when required and the consumption of electric power is minimized. Further, by adjusting the stroke of the depression of the operation lever 12, the point of the sliding contact between the brush 19 and the resistor board 18 belonging to the speed control circuit 58 including the power transistor 14 is varied, and the torque output of the motor M is varied accordingly, whereby the output of the power tool is adjusted to a desired value which is suitable for the particular application.

When the operation lever 12 is depressed all the way, the moveable block 20 moves to the rear most position and the switch 64 is closed. As a result, the collector and emitter of the power transistor 14 of the final stage of the speed control circuit are directly connected to each other, and the torque output of the motor M is maximized. As result, the power loss due to the internal resistance of the power transistor 14 is eliminated, and not only the power output of the power tool is maximized but also the generation of heat from the power transistor 14 is minimized.

On the other hand, when the operation lever 12 is released, the moveable block 20 moves to the front most position under the biasing force of the return spring 21, and the reversion control switching lever 41 and the operation lever 12 return to their original angular positions. Thus, the corresponding moveable contact piece 33 is also restored to its initial position, and the power is turned off.

Simultaneously as the power is turned off, the moveable contact piece 33 contacts the contact 50 again with the result that the electromotive force due to the inertia motion of the motor M applies a braking force to the motor M and stops and motor M instantaneously. Thus, the power tool is given with a favorable turn off or quick stop property.

When the operation lever 12 is depressed with the reversion control lever 41 turned in the reverse direction indicated by another arrow R in FIG. 1 about the pivot pin 16 by using the finger knob 41*b*, the resulting movement of the moveable block 20 causes the guide pin 26 to move along the other cam slot sections 42*b* of the cam slot 42 and the other slider pins 38*a* to be pressed in such a manner that the slider 37 and the moveable contact piece 34 undergo sliding motions, so as to connect the contact 52 and 53 with each other.

As a result, electric current is conducted through the path defined by the first power source terminal 43, the NO contact 53, the moveable contact piece 34, the common contact 52, the second motor terminal 47, the DC motor M, the first motor terminal 46, the common contact 49, the moveable contact piece 33, the NC contact 50, the common terminal 45, the power transistor 14, and the second power source terminal 44, and the power source is turned on so as to drive the motor M in the reverse direction. The operation of the power tool after the reverse rotation of the motor M is otherwise identical to that described in conjunction with the normal rotation of the motor M.

Thus, the composite functions of the on-off control of the motor M, the supply of electric power to the rotational speed control circuit 58, the reversion control of the motor M, and the quick stop control of the motor M can be accomplished with a single switch structure which comprises the slide switch units A and B, the reversion control switching lever 41, and the horizontally rotatable arm 24, and the internal structure of the DC motor powered power tool can be substantially simplified. Furthermore, since these control functions can be performed as a single operation, the switch system is made more convenient than heretofore.

Further, since the various parts A, B, 41 and 24 and the moveable block 18 are accommodated in the switch casing in a compact and planar arrangement, the assembly process of the switch structure is simplified.

Thus, the functions of the reversion control, the on-off control, the supply of electric power to the rotational speed control circuit and the braking control of the motor can be accomplished through selection of one of the two switch units. Through such a combination of the functions, there can be provided a power tool which is simple in structure, low in cost, small in size and easy to assemble.

What we claim is:

1. An electric switch system for a power tool which is powered by a DC motor, comprising:
- a movable block adapted to be displaced within a range of movement, said range having a first position and a second position;
- a fixed block arranged adjacent to said movable block;
- a selection lever pivotally attached to said fixed block, said selection lever having a guide means engaging said movable block for guiding said selection lever so that said selection lever is manually rotatable from a neutral middle position to either side only when said movable block is in said first position, said guide means for angularly guiding said selection lever when said movable block is not in said first position;
- a reversion control contact means which modulates the polarity of electric current supplied to the motor to one polarity if said selection lever is angularly displaced to one side and another polarity if said selection lever is displaced to an other side; and
- a speed control slide contact means mounted on said movable block for modulating the magnitude of the electric current supplied to said motor with respect to the position of said movable block.

2. An electric switch system for a power tool according to claim 1, wherein said reversion control contact means further comprises a braking means for electrically connecting two electrical leads of said motor thereby producing electromagnetic braking when said selection lever is in said neutral middle position.

3. An electric switch system for a power tool as defined in claim 2, further comprising a semiconductor device for controlling the supply of electric current to said motor according to the state of said speed control slide contact set by way of a control, and a pair of diodes conducting electric current from either end of said motor for conducting electric current of one polarity to said control circuit.

4. An electric switch for a power tool as defined in claim 3, further comprising a full power contact set disposed on said movable block for bypassing the output ends of said semiconductor device when the movable block is displaced to said second position.

5. An electric switch system for a power tool as defined in claim 1, wherein said guide means comprises:
- a first guide slot,
- a second guide slot, and
- a connecting guide slot; said connecting slot extending between first ends of said first and second guide slots so that the overall configuration is substantially "V" shaped;
- further comprising a guide pin which is guided along said first guide slot, said second guide slot, and said connecting slot; said guide pin being located in said connecting slot when said movable block is in said first position and said manual selection lever is said neutral middle position; said guide pin being guided along one of said first guide slot and said second guide slot when said movable block is moved from said first position toward said second position.

6. An electric switch system for a power tool as defined in claim 5, wherein said guide slots and connecting slot are provided at one end of said manual selection lever, and said guide pin is provided at a free end of an arm which is attached to said moveable block so as to be rotatable over a certain small angle.

* * * * *